United States Patent Office 2,989,382
Patented June 20, 1961

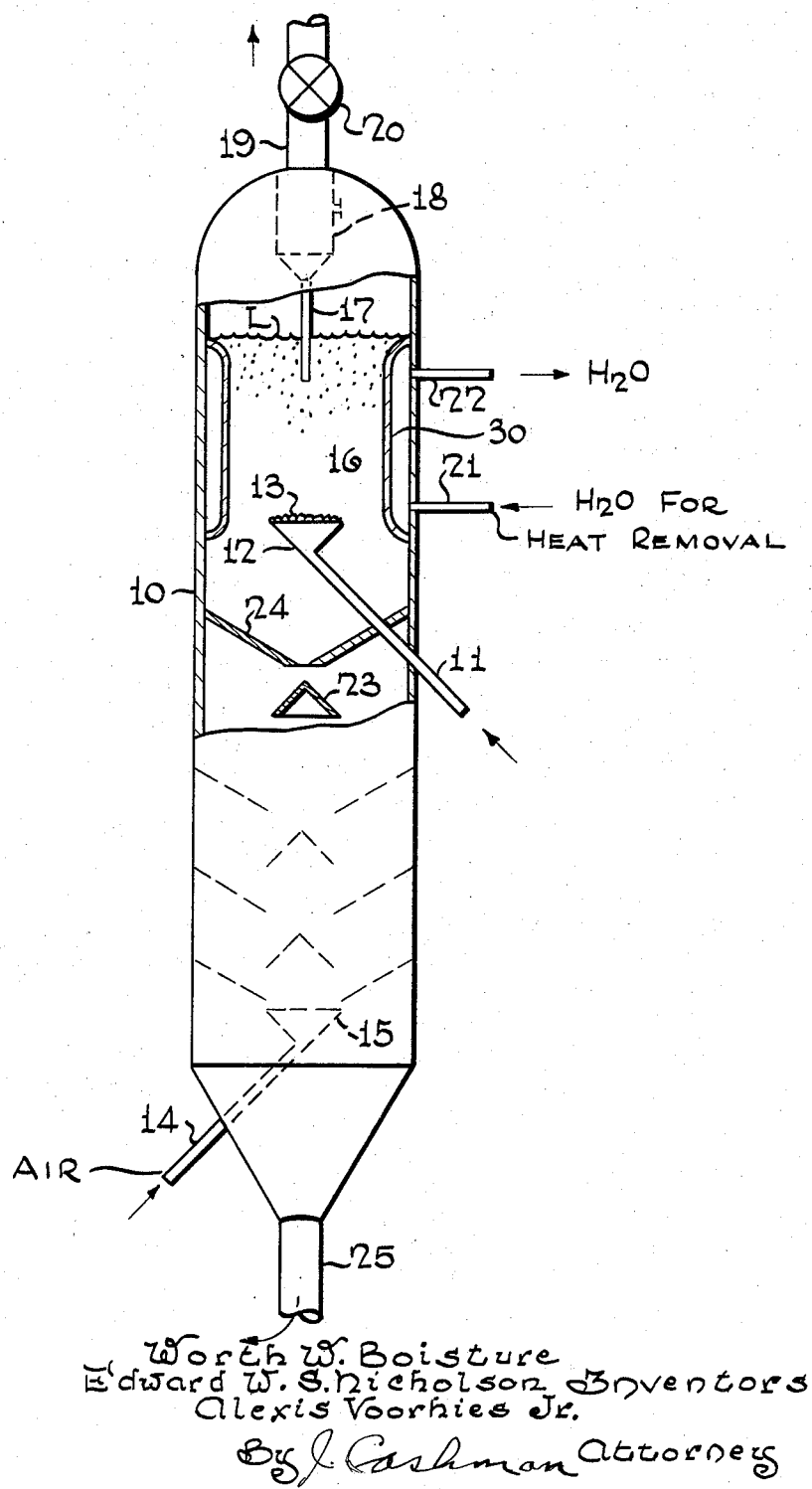

2,989,382
REGENERATOR FOR FLUID HYDROFORMING
Alexis Voorhies, Jr., Edward W. S. Nicholson, and Worth W. Boisture, Baton Rouge, La., assignors to Esso Research and Engineering Company, a corporation of Delaware
Filed Oct. 3, 1952, Ser. No. 312,880
2 Claims. (Cl. 23—288)

This invention relates to the catalytic conversion of hydrocarbon fractions boiling within the motor fuel boiling range of low knock rating into high octane number motor fuels rich in aromatics and particularly to an improved regenerator which may be used in fluidized solids reactor systems, in which such conversions are carried out.

Hydroforming is a well known and widely used process for treating hydrocarbon fractions boiling within the motor fuel or naphtha range to upgrade the same or increase the aromaticity and improve the anti-knock characteristics of said hydrocarbon fractions. By hydroforming is ordinarily meant an operation conducted at elevated temperatures and pressures in the presence of solid catalyst particles and hydrogen whereby the hydrocarbon fraction is increased in aromaticity and in which operation there is not net consumption of hydrogen. Hydroforming operations are ordinarily carried out in the presence of hydrogen or hydrogen-rich recycle gas at temperature of 750–1150° F. in the pressure range of about 50–1000 lbs. per square inch and in contact with such catalysts as molybdenum oxide, chromium oxide, or, in general, oxides or sulfides of metals of groups IV, V, VI, VII and VIII of the periodic system of element alone, or generally supported on a base or spacing agent such as alumina gel, precipitated alumina or zinc aluminate spinel. A good hydroforming catalyst is one containing about 10 wt. percent molybdenum oxide upon an alumina base prepared by heat treating a hydrated aluminum oxide or upon a zinc aluminate spinel.

It has been proposed in application Serial No. 188,236, filed October 3, 1950, now Patent No. 2,689,823, to effect the hydroforming of naphtha fractions in a fluidized solids reactor system in which naphtha vapors are passed continuously through a dense, fluidized bed of hydroforming catalyst particles in a reaction zone, spent catalyst particles being withdrawn from the dense, fluidized bed in the reaction zone and passed to a separate regeneration zone where inactivating carbonaceous deposits are removed by combustion whereupon the regenerated catalyst particles are returned to the main reactor vessel. Fluid hydroforming as thus conducted has several fundamental advantages over fixed bed hydroforming such as (1) the operations are continuous; (2) the vessels are designed for single rather than dual functions; (3) the reactor temperature is substantially constant throughout the bed, and (4) the regeneration or reconditioning of the catalyst may be readily controlled.

In view of the rapidity with which carbonaceous deposits are consumed under the temperature and pressure conditions obtaining in a fluid hydroforming system it has been proposed in the above-identified application to split the air stream to the regenerator using at most 15 to about 40% of the regeneration air to convey the spent catalyst through the transfer line into the regenerator and supplying the remainder of the regeneration air directly to the regeneration zone. It has also been proposed to limit the size of the regenerator and control the rate of circulation so that the average residence time of the catalyst in the reaction zone is of the order of from about 2 to 4 hours and in the regenerator of from about 3 to 15 minutes.

It has been found that poor activity and selectivity are often encountered when operating in accordance with the foregoing teachings even when using catalysts that show good activity and selectivity in small, fixed-bed unit evaluation tests. Results have been found to be particularly bad when running high sulfur feed stocks.

It is the object of this invention to provide the art with an improved regenerator for a fluidized solids hydroforming reactor system.

It is also the object of this invention to provide a regenerator for a fluidized solids hydroforming reactor system that will maintain catalyst activity and selectivity at a high level.

It is a further object of this invention to provide the art with a regenerator for a fluidized solids hydroforming reactor system that will maintain catalyst activity and selectivity at a very high level even when running poor quality or high sulfur feed stocks.

It is also an object of this invention to provide an improved method for regenerating hydroforming catalyst particles.

These and other objects will appear more clearly from the detailed specification and claims which follow.

It has been found that the activity and selectivity of catalysts in fluidized solids hydroforming reactor systems can be maintained at high levels even when running low quality or high sulfur feed stocks if the catalyst holding time in the regenerator is increased to more than 30 minutes and preferably to from about 1 to 4 hours. This extended time in the regenerator or under regeneration or oxidizing conditions serves to effect a more complete removal of sulfur or sulfur compounds from the catalyst. Moreover, water and crystalline molybdena or other crystalline catalytic metal oxide formed as the result of the action of water present in the catalyst or formed by combustion is eliminated and the molybdena or other catalytic metal oxide is thoroughly redispersed upon the support by the prolonged treatment under regeneration conditions. This extended treatment of the catalyst under regeneration or oxidizing conditions can be achieved advantageously by providing a soaking and stripping zone in the lower part of the regenerator vessel through which the catalyst passes after normal regeneration to remove carbon and wherein the catalyst particles are maintained under regeneration or oxidizing conditions for an extended period of time.

Reference is made to the accompanying drawing illustrating one embodiment of the present invention.

In the drawing, 10 is the regenerator vessel which may desirably be a vertical, cylindrical vessel of considerable length. Spent catalyst suspended in a stream of air or other carrier gas is carried through inlet line 11 to the inlet cone 12 arranged within the regenerator or regenerator-soaker vessel 10. A perforated plate or grid member 13 arranged on the inlet cone 12 in order to distribute the incoming catalyst and air uniformly over the cross-section of the vessel 10. In order to minimize the danger of overheating the catalyst in the transfer or inlet line 11, only part of the air required for regeneration, generally about 15 to 40% of the air necessary for regeneration is utilized as carrier gas to convey the spent catalyst through transfer or inlet line 11 into regenerator 10. The remainder of the air necessary for the regeneration or treatment of the catalyst is supplied directly to vessel 10 through nozzles or other distributing means arranged in the vicinity of inlet cone 12 and/or through inlet line 14 and inlet cone or distributor 15 arranged in the lower part of vessel 10. The amount of air utilized to convey the spent catalyst into the regenerator can be minimized by using a U-bend transfer line instead of a standpipe and dilute phase riser. The velocity of the regeneration gases or air through vessel 10 is so controlled as to form a dense, fluidized, liquid simulating bed 16 of catalyst particles and gas. The fluid bed 16 has a definite level L and is superposed by a dilute or disperse phase 17 comprising small amounts of catalyst entrained in regeneration gases. Regeneration gases are taken overhead from the regenerator vessel 10 through a cyclone separator 18 or the like which separates entrained catalyst from the outgoing gases and returns the separated catalyst particles to the dense bed 16 via the dip pipe attached to the bottom of the cycle. The regeneration gases are then passed via outlet line 19 through a pressure reducing or release valve 20 and thence to a waste gas stack or to suitable scrubbing and storage means if it is desired to utilize this gas for stripping purposes in the system.

In view of the fact that the oxidative reactions that occur in the regenerator generate more heat than can normally be transferred to the reactor by the circulating catalyst at low catalyst to oil ratios, without exceeding safe temperature limits, it is generally advisable to provide cooling means in the regenerator to control the temperature therein. Accordingly, a cooling jacket 30 through which water or other heat exchange fluid is circulated as through inlet 21 and outlet 22 is arranged in indirect heat exchange relation to the dense fluidized bed 16 in the regenerator. Instead of the cooling jacket as shown, cooling coils may be arranged within the bed. A very desirable arrangement of cooling coils is one in which a primary cooling coil is arranged entirely below the dense bed level L and a secondary cooling coil is arranged partly below and partly above the dense bed level L, thereby permitting adjustment of the heat exchange capacity by simply varying the dense bed level L in the regenerator.

That portion of the regenerator vessel 10 above the inlet cone 13 is a high velocity regeneration zone i.e. the superficial velocity of the regeneration gases is about 0.6 to about 1.0 ft. per second or sufficient to give turbulence and thorough mixing of the catalyst and the regeneration gas. The average residence time of the catalyst in this section is generally less than 15 minutes and may be as short as about 3 to 5 minutes. That portion of the regenerator vessel 10 below the inlet cone 13 is a low velocity soaking zone, i.e. the superficial velocity of the regeneration gas or air preferably as low as possible while still maintaining fluidity. In order to improve contact of the air introduced through distributor cone 15 and the catalyst particles in the low velocity soaking zone, and also to minimize top to bottom mixing of catalyst so that essentially none is discharged from the vessel without adequate soaking, it is desirable to provide suitable baffles in the low velocity soaking zone. These may be side to side baffles or disc and donut baffles comprising vertically spaced conical members 23 and inverted frusto conical members 24. Hold up in the low velocity soaking section should be sufficient that the catalyst is maintained in contact with air for at least one-half hour and up to about four to five hours.

The catalyst particles are discharged from the bottom of the regenerator-soaker 10 into standpipe 25 and thence through suitable flow control means such as a slide valve into a transfer line for conveyance to a pretreater or reducer or directly to the main reaction or hydroforming zone. If desired, a stripping gas such as nitrogen, steam or the like can be supplied to the lower part of the regenerator or to the standpipe 25 in order to prevent oxygen or carbon oxides from being entrained with the regenerated catalyst particles and carried alone into the pretreater or reactor vessel. Recycle gas or hydrogen-rich gas formed in the process is desirably used as the carrier gas for conveying the regenerated catalyst to the reactor vessel, and, because of its hydrogen content, it serves to at least partially reduce the catalytic metal oxides formed in the regeneration. Since the recycle gas is ordinarily supplied at temperatures of about 1100–1200° F. and the regenerated catalyst is at or near this temperature, it is desirable to minimize the residence time of the mixture of regenerated catalyst and recycle gas in the transfer line and the inlet to the reactor. Ordinarily this residence time should be less than about 15 seconds and preferably is of the order of about 3 to 5 seconds or less.

It will be understood that the regenerator-soaker vessel will be used in combination with a suitable reactor vessel, not shown, in which naphtha or low-boiling hydrocarbon feed stock is converted or hydroformed into higher octane number products while inactivating carbonaceous deposits are formed on the catalyst particles. The reactor vessel may be of the upflow type in which event the line 11 will be connected to a hopper or other suitable accumulator means associated with cyclone separators or the like which serve to separate catalyst particles from vaporous reaction products, or the reactor vessel may be of the dense bed, bottom draw-off type. In the latter case, catalyst is withdrawn directly from a dense, fluidized bed in the lower part of the reactor vessel, subjected to stripping and passed to the regenerator-soaker vessel 10 either via a standpipe and dilute phase riser 11 or via a U-bend transfer line.

The feed or charging stock to the hydroforming reactor system may be a virgin naphtha, a cracked naphtha, a Fischer-Tropsch naphtha or the like having a boiling range of about 150–430° F. The feed stock is preheated alone or in admixture with recycle gas to reaction temperature or to the maximum temperature possible while avoiding thermal degradation of the feed stock. Ordinarily preheating of the feed stock is carried out to temperatures of about 800–1050° F., preferably about 1000° F. The naphtha preheat should be as high as possible while avoiding thermal degradation thereof as by limiting the time of residence in the furnace and transfer and feed inlet lines.

Recycle gas, which contains from about 50 to 80 vol. percent hydrogen is preheated to temperatures of about 1100–1250° F., preferably about 1200° F. prior to passage thereof into the reactor vessel. The recycle gas should be circulated through the reactor at a rate of from about 1000 to 8000 cu. ft. per barrel of feed. The amount of recycle gas is preferably the minimum amount that will suffice to introduce the necessary heat of reaction and keep carbon formation at a low level.

The reactor system is charged with a mass of finely divided hydroforming catalyst particles. Suitable catalysts include group VI metal oxides such as molybdenum oxide, chromium oxide or tungsten oxide or mixtures thereof, preferably upon a support or carrier such as activated alumina, zinc aluminate spinel or the like. Preferred catalysts contain about 5 to 15 wt. percent molybdenum oxide or from about 10 to 40 wt. percent chromium oxide upon a suitable carrier. If desired, minor amounts of stabilizers and promoters such as silica, calcium oxide, ceria or potassia can be included in the catalyst. The catalyst particles are, for the most part, between 200 and 400 mesh in size or about 0–200 microns in diameter with a major proportion between 20 and 80 microns.

The hydroforming reactor vessel is operated at temperatures between about 850 and 925° F., preferably at about 900° F. and at pressures of between 50 and 500 lbs. per sq. inch, preferably about 200 lbs. per sq. inch. Temperatures above about 900° F. result in increased carbon formation and lower selectivity to gasoline fractions while at temperatures below about 900° F. operating severity is low and would therefore require an excessively large reactor vessel. Lowering reactor pressure below 200 lbs. per sq. inch ordinarily results in increased carbon formation which becomes excessive in most cases at pressures below about 75 lbs. per sq. inch. Above 200 lbs. per sq. inch, however, catalyst selectivity to light products ($C_4$'s and lighter) increases rapidly. The regenerator-soaker vessel is normally operated at essentially the same pressure as the reactor vessel and at temperatures of about 1050–1200° F. The residence time of the catalyst in the reactor is of the order of from about 2 to 4 hours and in the regenerator-soaker from about one-half to about 4 hours.

The weight ratio of catalyst to oil introduced into the reactor should be about 0.5 to 1.5. It is preferred to operate at catalyst-to-oil ratios of about 1 since ratios above about 1 to 1.5 result in excessive carbon formation. Somewhat higher weight ratios can be used at higher pressures.

Space velocity or the weight in pounds of feed charged per hour per pound of catalyst in the reactor depends upon the age or activity level of the catalyst, the character of the feed stock and the desired octane number of the product. Space velocity for a molybdenum oxide on alumina gel catalyst may vary, for example, from about 1.5 wt./hr./wt. to about 0.15 wt./hr./wt.

The foregoing description contains a limited number of embodiments of the present invention. It will be understood, however, that numerous modifications can be made without departing from the scope of the present invention.

What is claimed is:

1. A regenerator-soaker vessel for the treatment of spent hydroforming catalyst particles comprising in combination a vertical, elongated vessel, a wall member dividing said vessel into an upper regeneration and a lower, soaking section, inlet means for the introduction of spent catalyst particle sand regeneration gas into the lower part of said upper, regeneration section of said vessel, an outlet line for the withdrawal of regeneration gas substantially free of catalyst particles in the top of said vessel, an opening in said wall member for the discharge of regenerated catalyst particles from the bottom of said regeneration section into the upper part of the soaking section and for the passage of regeneration gas from the upper part of the soaking section into the bottom of the regeneration section, said opening in the wall member being the only outlet for the discharge of gases from the top of said soaking section, inlet means for the introduction of additional regeneration gas at the lower part of said soaking section and baffle means within said soaking section for improving contact of the regenerated catalyst particles with the additional gas introduced at the lower part of said soaking section and outlet means for the withdrawal of regenerated solids at the bottom of said soaking section.

2. A regenerator-soaker vessel for the treatment of spent hydroforming catalyst particles comprising in combination a vertical, elongated vessel, a wall member dividing said vessel into an upper regeneration and a lower, soaking section, inlet means for the introduction of spent catalyst particles and regeneration gas into the lower part of said upper, regeneration section of said vessel, an outlet line for the withdrawal of regeneration gas substantially free of catalyst particles in the top of said vessel, means above said inlet means for circulating cooling fluid in indirect heat exchange relation to the catalyst particles undergoing regeneration in said upper, regeneration section, an opening in said wall member for the discharge of regenerated catalyst particles from the bottom of said regeneration section into the upper part of the soaking section and for the passage of regeneration gas from the upper part of the soaking section into the bottom of the regeneration section, said opening in the wall member being the only outlet for the discharge of gases from the top of said soaking section, inlet means for the introduction of additional regeneration gas at the lower part of said soaking section and baffle means within said soaking section for improving contact of the regenerated catalyst particles with the additional gas introduced at the lower part of said soaking section and outlet means for the withdrawal of regenerated solids at the bottom of said soaking section.

References Cited in the file of this patent

UNITED STATES PATENTS

| | | |
|---|---|---|
| 2,437,334 | Roethell | Mar. 9, 1948 |
| 2,502,954 | Blanding | Apr. 4, 1950 |
| 2,541,801 | Wilcox | Feb. 13, 1951 |
| 2,581,670 | Kassel | Jan. 8, 1952 |
| 2,589,124 | Packie | Mar. 11, 1952 |
| 2,619,415 | Hemminger | Nov. 25, 1952 |
| 2,620,313 | Odell | Dec. 2, 1952 |
| 2,628,158 | Wilcox et al. | Feb. 10, 1953 |
| 2,631,927 | Trainer et al. | Mar. 17, 1953 |
| 2,633,417 | Goronowski et al. | Mar. 31, 1953 |
| 2,637,633 | Strunk | May 5, 1953 |
| 2,685,498 | Dickinson | Aug. 3, 1954 |